United States Patent [19]

Valente et al.

[11] Patent Number: 4,625,404
[45] Date of Patent: Dec. 2, 1986

[54] CHEESE SEGMENTER

[75] Inventors: Peter Valente; Matthew A. Rocco; Barbara B. Rocco, all of Allendale, N.J.

[73] Assignee: Matthew & Barbara Rocco, Allendale, N.J.

[21] Appl. No.: 702,605

[22] Filed: Feb. 19, 1985

[51] Int. Cl.[4] .......................... A21C 5/08; A21C 15/04
[52] U.S. Cl. .......................................... 30/114; 30/303
[58] Field of Search ................. 30/114, 302, 303, 315, 30/316

[56] References Cited

U.S. PATENT DOCUMENTS 1,364,863  1/1921  Buchtel .................................. 30/303
1,446,767  2/1923  Price .................................... 30/303

Primary Examiner—Douglas D. Watts
Attorney, Agent, or Firm—Kenyon & Kenyon

[57] ABSTRACT

The cheese knife is constructed with a rectangular frame having four blades with cutting edges on the bottom and with a pair of crossing blades within the frame having cutting edges on the bottom. In one pass through a cheese block, the block can be cut in half while four equal-sized pieces are simultaneously cut from one of the halves of the block. In a second pass, the remaining half of the cheese block can be cut into four equal-sized pieces.

The knife has a pair of handles which are curved to avoid injury to the user's knuckles during use.

3 Claims, 3 Drawing Figures

CHEESE SEGMENTER

This invention relates to a knife. More particularly, this invention relates to a cheese knife and a method of cutting an elongated cheese block.

Heretofore, various types of knives have been known for slicing food stuffs such as cheese. For example, the knives have been constructed of a single cutting blade with a single handle or a double handle.

As is also known, cheese is usually transported in block form by a wholesaler to a retailer and subsequently sliced into appropriate sizes for consumption. In the case of mozzarella cheese which is delivered to a pizzeria, the mozzarella cheese has been delivered in the form of a block having a maximum shape of about 4 inches by 5 inches by 10.5 inches. In order to reduce this block into suitable pieces for subsequent handling, it has been known to cut the block in half with a single handled knife or a double-handled knife having a single cutting blade and thereafter to slice each half by making several subsequent cuts to achieve an approximate size which can be placed in a cheese shredder. Usually, the pieces are the size of $1\frac{1}{2}$ inches by $2\frac{1}{2}$ inches by 5 inches. The shredder is thereafter able to shred the pieces into appropriate smaller sizes for use in baking a pizza.

The cutting of a mozzarella cheese block into several pieces using a conventional knife is time consuming. Further, the manual slicing of a cheese block with a knife can result in the pieces being of unequal size. Furthermore, in using a single handled knife, there is some risk that the user may be injured during manipulation of the cheese pieces and knife during cutting.

Accordingly, it is an object of the invention to provide a knife for slicing mozzarella cheese in a simple rapid manner.

It is another object of the invention to reduce the risk of injury when cutting mozzarella cheese blocks.

It is another object of the invention to cut a cheese block into a multitude of pieces with a minimum of cuts.

It is another object of the invention to provide a knife capable of cutting a cheese block into pieces of uniform size.

It is another object of the invention to reduce waste in the slicing of a mozzarella cheese block.

Briefly, the invention provides a knife which is comprised of a frame having a peripheral cutting edge on a bottom side, a pair of blades which extend within and across the frame in crossing relation to each other with each blade having a cutting edge on a bottom side and with the knife having a pair of handles which extend from opposite sides of the frame. With the frame constructed in a rectangular shape, and with the cutting blades disposed perpendicularly of each other, a cheese block sized to the size of the knife frame can be cut into four equal pieces in a single slicing operation.

Further, by providing the knife with handles at opposite ends and by providing each handle with a bottom surface sufficiently disposed above a plane of the bottom of the frame for a user's hands to be separated by a clearance from the top of the cutting surface when the knife is in a down-most position, a user can quickly and easily slice through the cheese block without a risk or fear of a risk that the user's hands may hit on the cutting surface. This permits a rapid and safer cutting as well as less effort to be used in cutting the cheese.

By forming pieces of cheese of uniform size, for example, for subsequent shredding in a shredder for use in the baking of pizzas in a commercial pizzeria, less cheese may be used since the uniform size of the pieces facilitates the shredding process and provides substantially uniform pieces which do not need to be weighed. This is of particular advantage in commercial pizzerias from the standpoint of waste and cost control.

The invention also provides a two-step method of cutting an elongated cheese block which is particularly economical and time-saving. In this respect, in a first step, the cheese block is cut transversely into two halves while one of the halves is simultaneously cut transversely and longitudinally into four equal sized pieces. In a following second step, the remaining cheese half is transversely and longitudinally cut into four equal sized pieces.

These and other objects and advantages of the invention will become more apparent from the following detailed description taken in conjunction with the accompanying drawings wherein.

Figure 1:
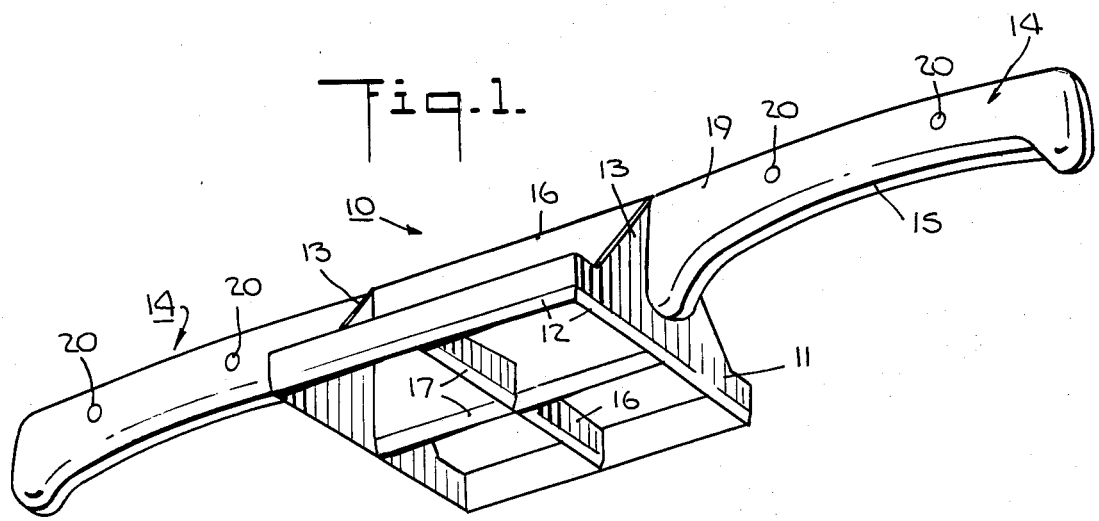
FIG. 1 illustrates a perspective view of a knife constructed in accordance with the invention.

Referring to FIG. 1, the knife 10 is constructed with a rectangular frame 11 which has a peripheral cutting edge 12 on a bottom side. As indicated, the frame 11 has four sides so that, in effect, four blades are formed, each with a bottom cutting edge 12. In addition, the frame 11 includes a pair of oppositely disposed upstanding extensions 13, each of which is of generally triangular shape.

As shown in FIG. 1, the knife also has a pair of handles 14, each of which is secured to a respective extension 13. In addition, each handle 14 has a curved bottom surface 15 which is disposed above the horizontal plane of the bottom of the frame 11. This permits the knife 10 to be held in two hands and pressed downwardly against a flat surface, such as a table or cutting block, without risk of injuring the user's knuckles on the table or cutting block.

Figure 2:
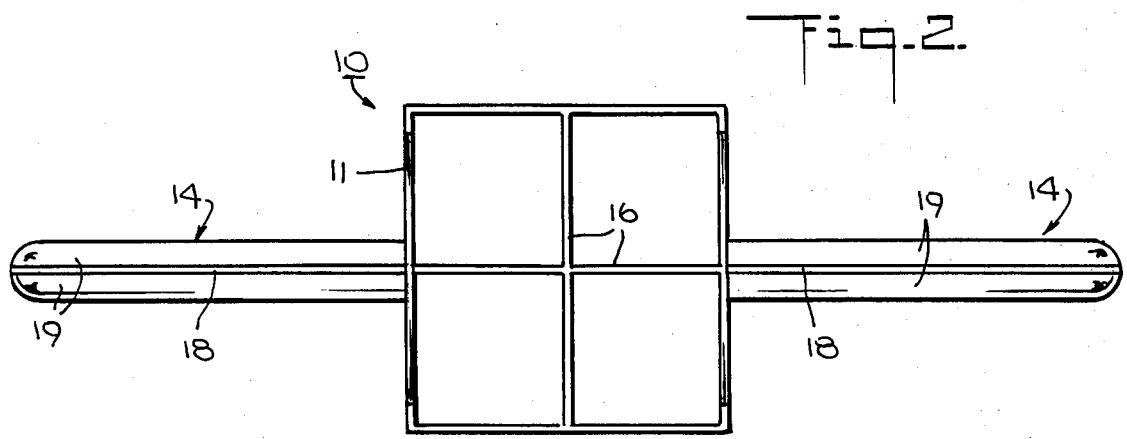
FIG. 2 illustrates a bottom view of the knife in FIG. 1.

Referring to FIGS. 1 and 2, the knife 10 also has a pair of blades 16 which extend within and across the frame 11 in perpendicular relation to each other. As shown in FIG. 1, each blade 16 has a chamfered cutting edge 17 on a bottom side which is coplanar with the cutting edge 12 of the frame 11. Each of the blades 16 is also integral with the frame 11. As illustrated in FIG. 1, one blade 16 extends longitudinally between the extensions 13 over the height (i.e. to the same height) of each extension 13 while the other blade 16 extends transversely only over the height of the frame 11.

As indicated in FIG. 2, each handle 15 may be formed of composite construction with a central metal plate 18 integrally secured at one end to an extension 13 with two wood pieces 19 secured to the plate 18 in sandwiched relation via a pair of rivets 20 or the like.

The frame 11 and the bisecting blades 16 may be made of stainless steel. In addition, the frame 11 may have a length in a direction parallel to the handles 14 of 5 inches and a width transverse to the handles 14 of $5\frac{1}{4}$ inches so that the size of each quadrant defined by the blades 16 is $2\frac{1}{2}$ inches by $2\frac{5}{8}$ inches.

Figure 3:
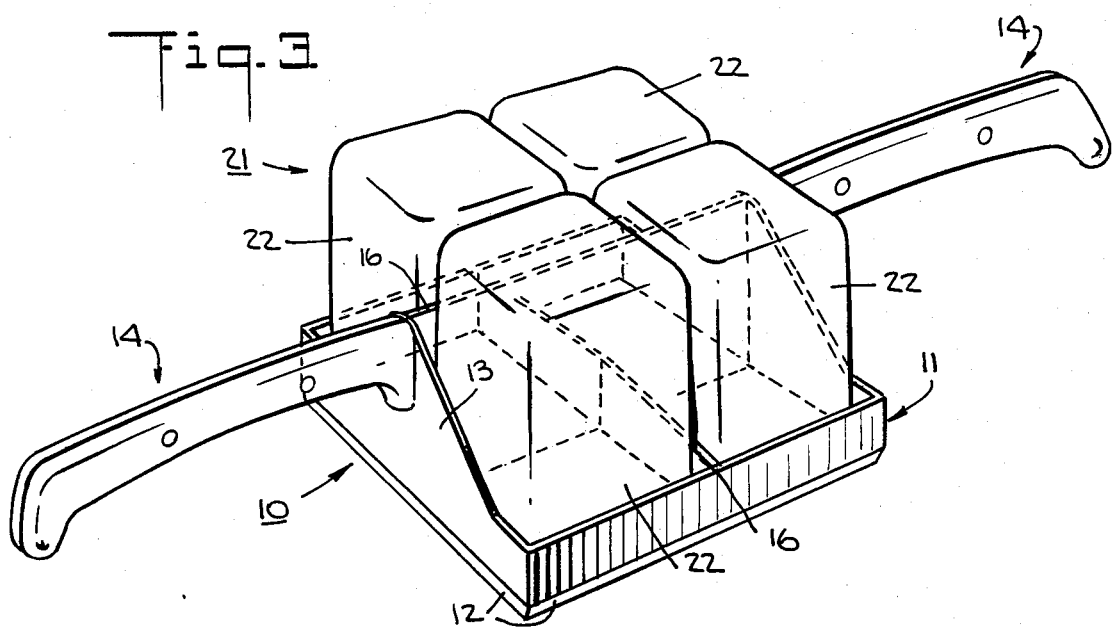
FIG. 3 illustrates the knife of FIG. 1 in a cutting position relative to a piece of cheese.

Referring to FIG. 3, in use, the knife 10 can be used to cut a block of cheese 21 into four equal pieces 22. For example, where the cheese block is of a length transverse to the handles 14 of $5\frac{1}{4}$ inches, a width of 5 inches and a height of 4 inches, the knife 10 can be positioned to slice downwardly through the block 21 so as to form four pieces 22, each of which has a size of 2⅜ inches by 2½ inches by 4 inches. These pieces 22 can then be readily used in a shredder or grater, for example, for shredding into suitable sizes for the baking of pizza In the case where a block of mozzarella cheese has a length of 10.5 inches, the knife 10 is positioned with the handles 14 perpendicular to the cheese block so that the block can be cut in half while, at the same time, one of the halves is sliced into four equal pieces as above described. Thus, only two cuts would be necessary to cut a 10.5 inch cheese block into eight individual pieces of a size suitable for grating or shredding.

Of note, the rectangular frame 11 need not be provided with a cutting edge 12 on each side. Instead, only the two sides parallel to the handles 14 need be provided with a cutting edge. This allows the user to pick up and use the knife without having to determine which side has to be placed at the midpoint of a cheese block.

The invention thus provides a knife which can be employed in a relatively safe and economical manner. In this regard, positioning of the cutting edges between the two handles allows the knife to be more readily used in a safe manner. Further, by appropriately spacing the bottom surfaces of the handles above the plane of the cutting edges, the risk of injury to the user's knuckles by being sandwiched between the handles and a cutting block against which the knife is directed is substantially reduced. Also, the use of two handles and their positioning enables use of the user's upper body weight to facilitate cutting and also ensures that neither hand can be in a position to be cut by the knife during use. Further, since multiple pieces can be formed by each slicing movement, the time required for cutting up an elongated cheese block can be substantially reduced.

The invention further provides a knife which is able to cut a cheese block into equal pieces of convenient size for subsequent use in a shredder or grater for further shredding of the pieces. This permits a more efficient use of a shredder or grater and reduces the amount of cheese waste.

The invention further provides a method for cutting an elongated cheese block into equal pieces in a relatively quick and economical manner. In this regard, in a first step, the cheese block is transversely cut into two halves while one half is simultaneously cut transversely and longitudinally into four equal sized pieces. In a second step, the remaining cheese half is transversely and longitudinally cut into four equal size pieces. The eight pieces which are obtained are of equal size to each other and can be readily used in a shredding apparatus for shredding into suitable size for use in the baking of pizzas in a commercial pizzeria.

What is claimed is:

1. A knife for cutting an elongated cheese block comprising a rectangular frame having four sides, each side of one pair of parallel sides defining a blade with a cutting edge on a bottom thereof, and a pair of oppositely disposed vertically upstanding extensions of generally triangular shape extending upwardly from the other pair of parallel sides;

a pair of blades extending within and across said frame in perpendicular relation to each other, each of said pair of blades having a cutting edge on a bottom side thereof coplanar with said cutting edges of said frame, one of said pair of blades extending longitudinally between said extensions and being integral with said extensions while extending upwardly to the same height as said extensions, the other of said pair of blades extending upwardly to the same height as said one pair of parallel sides of said frame; and a pair of handles, each handle extending from a respective extension of said frame with a bottom surface disposed above a plane of said cutting edges of said frame.

2. A knife as set forth in claim 1 wherein said other pair of parallel sides of said frame each has a cutting edge on a bottom thereof.

3. A knife as set forth in claim 1 wherein each said handle has a curved bottom surface.

* * * * *